United States Patent Office 3,420,800
Patented Jan. 7, 1969

3,420,800
POLYMERIC MATERIALS PRODUCED BY INTERACTING POLYISOCYANATE AND WATER IN THE PRESENCE OF POLYALDIMINE OR POLYKETIMINE
Geoffrey Arthur Haggis, Manchester, England, assignor to Imperial Chemical Industries Limited, London, England, a corporation of Great Britain
No Drawing. Filed Jan. 29, 1964, Ser. No. 341,114
Claims priority, application Great Britain, Feb. 4, 1963, 4,507/63
U.S. Cl. 260—75      8 Claims
Int. Cl. C08g 22/00; C08g 22/02

ABSTRACT OF THE DISCLOSURE

Polyaldimines or polyketimines derived from diamines or polyamines are added to polyisocyanates, preferably dissolved in inert solvents, to give solutions which are stable for periods up to several weeks, but which solutions, on treatment with water or exposure to the atmosphere, rapidly produce a cross-linked polymer and may be used to provide a rapid-drying surface coating of excellent physical properties. It is however preferred to use, as the polyisocyanate, isocyanate-ended prepolymers obtained by the interaction of excess of a polyisocyanate with a glycol or other polyhydric, alcohol, polyester, polyesteramide or polyether.

---

This invention relates to the manufacture of polymers, and more particularly to the manufacture of polymers by the interaction of polyisocyanates, water and polyaldimines or polyketimines.

Polymers derived from polyisocyanates are valuable in many applications such as plastics, rigid or flexible foams, rubbers and surface coatings. For this last application one procedure consist in applying a solution of polyisocyanates, at least in part of a polymeric nature such as may be obtained by interaction of polyesters with excess of diisocyanates, to the article which is to be coated and exposing the coating to the atmosphere. The coating absorbs water from the atmosphere which serves to polymerise further and cross-link the polyisocyanate. This procedure has the disadvantage that the reaction with water, and consequently the drying of the surface coating, tends to be slow. The addition of catalysts or of compounds containing active hydrogen atoms such as diamines will increase the drying speed but causes undesirable storage instability of the solution to be used for preparing the coating. Other polyurethanes, in particular rubbers often present similar difficulties in respect of cure by reaction with absorbed water or with added diamine.

It has now been discovered that polyaldimines or polyketimines derived from diamines or polyamines may be added to polyisocyanates, preferably dissolved in inert solvents, to give solutions which are stable for periods up to several weeks, but that such solutions on treatment with water or exposure to the atmosphere rapidly produce a cross-linked polymer and may be used to provide a rapid-drying surface coating of excellent physical properties.

The utility of the invention is not confined to the preparation of surface coatings. Polymers of a wide range of properties and suitable for application as plastics, foams, or rubbers may also be obtained, omitting solvents as appropriate, from suitable polyisocyanates, polyaldimines or polyketimines and water.

According to the invention therefore there is provided a process for the manufacture of isocyanate-based polymers which comprises interacting at least one organic polyisocyanate and water in the presence of a polyaldimine or polyketimine derived from a polyamine.

Examples of suitable organic polyisocyanates include aliphatic diisocyanates such as hexamethylene diisocyanate and tetramethylene diisocyanate, aromatic diisocyanates such as tolylene-2:4-diisocyanate, tolylene-2:6-diisocyanate, diphenylmethane-4:4'-diisocyanate, 3-methyldiphenylmethane-4:4'-diisocyanate, m- and p-phenylene diisocyanate, chlorophenylene-2:4-diisocyanate, naphthalene-1:5-diisocyanate, diphenyl-4:4'-diisocyanate, 4:4'-diisocyanate-3:3'-dimethyldiphenyl and diphenyl ether diisocyanate and cycloaliphatic diisocyanates such as dicyclohexylmethane diisocyanate and methylcyclohexylene diisocyanates. Triisocyanates which may be used include aromatic triisocyanates such as 2:4:6-triisocyanatotoluene and 2:4:4'-triisocyanatodiphenyl ether. Examples of other suitable organic polyisocyanates include the reaction products of an excess of a diisocyanate with polyhydric alcohols such as trimethylolpropane, uretedione dimers and isocyanurate polymers of diisocyanates for example of tolylene-2:4-diisocyanate, and biuret polyisocyanates obtained by reaction of polyisocyanates with water. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

It is however preferred to use isocyanate-ended prepolymers obtained by the interaction of excess of a polyisocyanate as described above with a glycol or other polyhydric alcohol, polyester, polyesteramide or polyether. Such polymers may contain allophenate groups derived from reaction of polyurethane groups with further isocyanate groups. For the preparation of surface coatings and rigid foams it is preferred that the prepolymer should contain a relatively high degree of branching, introduced by use of polyisocyanates or isocyanates-reactive components of functionality greater than two. For the preparation of rubbers or flexible foams essentially linear prepolymers are preferred being obtained by use of diisocyanates in combination with glycols or difunctional polyesters, polyesteramides or polyethers.

Preferably, in order to avoid any toxicity hazard and deposits of insoluble polymers, any unreacted diisocyanate present in the prepolymer should be removed, for example by distillation or solvent treatment.

As examples of polyether from which the prepolymers may be prepared there may be mentioned oxypropylated derivatives of glycerol, diethylene glycol, trimethylolpropane, and sorbitol. As examples of polyesters there are polydiethylene adipate, polyethylene/propylene adipate, and branched polyesters based on hexanetriol/adipic acid/phthalic acid. For use in prepolymers of value in surface coatings polyethers or polyesters of molecular weight between 250 and 2000 are preferred, although compounds of lower or higher molecular weight may be used if desired. Polyethers or polyesters of higher molecular weight are preferred in prepolymers for the preparation of rubbers or flexible foams.

The process of the present invention is of particular advantage when the polyisocyanate contains at least in part isocyanate groups bound to aliphatic or cycloaliphatic carbon atoms since such isocyanates are of low reactivity leading to slow reaction in absence of a catalyst or of the bisaldimines or bisketimines of the present invention. These polyisocyanates have advantages over aromatic polyisocyanates in that the mixtures with polyaldimine or polyketimine are much more stable to storage and the polymers obtained from them are less discolored by light.

The polyaldimines or polyketimines used in the present invention are those derived from diamines or polyamines and aldehydes or ketones, and may be obtained from these ingredients by known methods, for example by heating in an inert organic solvent with removal of water as it is formed. They may contain in addition a group reactive to isocyanate, for example hydroxyl or imino, so that the aldimine or ketimine will react with the polyisocyanate in absence of water without further polymerisation.

Polyamines from which the aldimines or ketimines may be obtained include ethylene diamine, propylene diamine, hexamethylenediamine, diaminocyclohexanes m- or p-xylyenediamines, diethylenetriamine, m- or p-phenylene diamine, tolylene-2:4- or 2:6-diamines, diaminodiphenylmethanes, 2:4:6-triaminomesitylene, 2:4:6-triaminoxylene, di-β-aminoethylsulphide, di-β-aminoethyldisulphide, di-β-aminoethylether, di-γ-amino-n-propylether, triglycoldiamine, polymers of alkylene oxides such as ethylene oxide in which the terminal hydroxyl groups are replaced by amino groups, 1:3-diaminopropan-2-ol, ω:ω'-diaminodi-n-hexylamine and dimethyl-1:4-diaminoadipate. The preferred polyamines are aliphatic or cycloaliphatic polyamines, especially diamines, since these compounds do not give rise to discolouration in the derived polymer.

Aldehydes or ketones which may be used in preparation of the aldimines or ketimines include acetaldehyde, propionaldehyde, n-butyraldehyde, isobutyraldehyde, 2-ethylbutraldehyde, valeraldehyde, isopentaldehyde, 2-methylpentaldehydes, 2-ethylhexaldehydes, acrolein, methacrolein, crotonaldehyde, furfural, pyrubic aldehyde, acrolein dimer, methacrolein dimer, 1:2:3:6-tetrahydrobenzaldehyde, 6-methyl-3-cyclohexene aldehyde, cyanoacetaldehyde, glyoxylic acid ethyl ester, benzaldehyde, acetone, methylisobutylketone, diethylketone, methylethylketone, methylpropylketone, methyl-n-amylketone, diisobutylketone, mesityl oxide, 2-acetylfuran, 4-methoxy-4-methylpentan-2-one, cyclohaxanone, and acetophenone. It is however desirable that the aldehyde or ketone have a boiling point below about 180° C. so that it is readily lost from the polymer during the curing stage. Aldimines are in general preferred to ketimines since they have less tendency to interact with polyisocyanates in absence of water.

Polyaldimines or polyketimines derived from certain sterically hindered polyamines or sterically hindered aldehydes or ketones are of especial value in this invention since the solutions of isocyanates containing such polyaldimines are significantly more stable than similar solutions containing other polyaldimines or polyketimines. This increased stability is obtained without any significant decrease in the speed of polymer formation in presence of water or loss of desirable properties in the polymers, for example surface coatings, so obtained. These sterically hindered polyaldimines and polyketimines are new compositions of matter.

By sterically hindered polyamines, aldehydes or ketones are meant those polyamines, aldehydes or ketones which contain amino or carbonyl groups attached directly to a carbon atom which is attached directly to three other carbon atoms.

As examples of sterically hindered polyamines from which polyaldimines or polyketimines suitable for use in the process of the invention may be prepared by condensation with aldehydes or ketones in general there may be mentioned 1:8-menthane diamine, 2:3-diamino-2:3-dimethyl butane, 2:4-diamino-2:3-dimethylpentane, 1:3-diamino-1-methylcyclohexane, and 1:6-diamino-1:1-dimethylhexane.

As examples of sterically hindered aldehydes and ketones from which polyaldimines and polyketimines suitable for use in the process of the invention may be prepared by condensation with polyamines in general there may be mentioned trimethylacetaldehyde (pivalic aldehyde), dimethylethylacetaldehyde, methyldiethylacetaldehyde, 1-methylhexahydrobenzaldehyde, and methyl-t-butylketone.

In general it is preferred on the grounds of increased stability of the polyisocyanate solutions containing them to use polyaldimines or polyketimines in which the aldehyde or ketone group, and optionally also one or more of the amino groups is sterically hindered rather than those in which one or more of the amino groups only are sterically hindered.

The process of the invention may be carried out by any conventional procedure for the manufacture of polymeric materials from polyisocyanates, and the choice of conditions, the preferred ingredients and the relative proportions of these will depend upon the type of polymer required. In general however it is preferred that the amount of polyaldimine or polyketimine be such that about one aldimine or ketimine group is present for every isocyanate group after allowing for any other isocyanate reactive group present.

The amount of water to be added will depend upon the type of polymer required and whether it is desired to utilize water absorbed from the air. In the case of surface coatings which will dry in an atmosphere containing moisture it is not necessary to add water at all. In general however the amount of water added should not be greater than that required to react with the free isocyanate groups present.

In the manufacture of surface coatings the polyisocyanate may for example be dissolved in an inert organic solvent such as toluene, xylene, 2-ethoxyethyl acetate, butyl acetate, or methyl isobutyl ketone and the polyaldimine or polyketimine is added to this solution. In the case of the hindered polyaldimines or hindered polyketimines it is however desirable to avoid the use of solvents containing carbonyl groups as these may affect the storage stability of such solutions. The solution, which is storage stable for a sufficient time is then used to coat the chosen substrate by any known method such as brushing, dipping or spraying, and the coating allowed to dry in the air at room temperature or at a temperature up to 100° C., or higher if desired. Suitable substrates include rubbers, paper, wood, leather, metals, glass, plastics such as polyvinyl chloride, and textiles of natural, artifical or synthetic materials.

In the case of plastics, foams, and rubbers the polyisocyanates, polyaldimines or polyketimines and any other ingredients may be mixed, usually in absence of a solvent, shaped if necessary for example in the case of rubbers into thread form, shaped if necessary and then cured at room temperature or by heating at up to 100° C., any necessary water being added during and preferably near to the end of the mixing stage. Water from the atmosphere may participate in at least a part of the cure, but this is not generally effective except in cases where the shaped polymer is thin and has a substantial part of its surface area exposed to the atmosphere. In the case of foamed products the gas necessary for foaming may be produced for example by the action of polyisocyanate or water, which may be used in excess over the stoichiometric quantity of bisaldimine or bisketimine, or by the addition of volatile substances such as trichlorofluoromethane, dichlorodifluoromethane, methylene dichloride, or ethyl chloride.

Other polymer forming ingredients may also be present in the process of this invention, for example polyhydric alcohols, polyesters, polyethers, polyesteramides, aminoalcohols and polyamines, but such ingredients will tend to reduce the storage stability of the polymer-forming mixture.

Other ingredients, which do not participate essentially in the polymer-forming reaction, may also be present, for example pigments, fillers, flame-proofing agents, surface active materials, and antioxidants.

The invention is illustrated but not limited by the following examples in which all parts and percentages are by weight unless otherwise stated.

EXAMPLE 1

A solution (A) is prepared from 5 parts of an isocyanate-ended prepolymer, prepared from polyethylene/propylene adiphate and 2:4/2:6-diisocyanatomethylcyclohexane, 3 parts of methylisobutyl ketone and 1 part of the bisketimine from methyl isobutyl ketone and m-xylylene diamine. A similar solution (B) is prepared omitting the bisketimine. Films are prepared from the solutions for comparison by pouring onto glass surfaces and allowing the solvent to evaporate. After 1 hour the film from solution (A) is touch-dry and after 19 hours has cured to a hard tough film, while the film from solution B remains tacky and uncured for at least 48 hours. The solution A on storage increases slowly in viscosity but is still usable after 2 weeks storage.

The isocyanate-ended prepolymer used above is prepared as follows:

205.6 parts of a mixture of 2:4 and 2:6-diisocyanatomethylcyclohexanes are stirred at 70° C. in an atmosphere of dry nitrogen; while 185.1 parts of polyethylene/propylene adipate having a hydroxyl value of 109.3 mg./KOH/gm. and an acid value of 1.6 mg./KOH/g. are added dropwise over 3 hours. After a further 6 hours stirring at a temperature between 70 and 75° C. the unreacted isocyanate is removed from the product by distillation in a thin film evaporator (spinning band column) under reduced pressure. The final product (241.7 parts) has an isocyanate content of 5.5% and is a viscous, almost colourless liquid.

EXAMPLE 2

A solution is prepared from 11.5 parts of an allophanate-containing condensate of hexamethylene diisocyanate and oxypropylated hexanetriol having an isocyanate content of 11.5%, 8 parts of butyl acetate and 3.1 parts of the bisketimine from methylisobutyl ketone and ethylene diamine. A film from the solution is touch-dry after 20 minutes, whereas a similar solution omitting the ketimine gives a film which remains tacky and uncured for at least 24 hours. The solution containing ketimine remains usable for several hours, but gels on storage for 16 hours.

The allophanate polyisocyanate is prepared as follows:

130 parts of an oxypropylated hexane triol having a hydroxyl content of 7.0% are added dropwise with stirring over 1 hour to 377.4 parts of hexamethylene dissocyanate at a temperature between 70 and 75° C. After a further 3 hours at between 70 and 75° C., the temperature is raised to between 130 and 135° C. and maintained at this temperature until the isocyanate content of the mixture has fallen to 26.2%. The unreacted isocyanate is removed by distillation under reduced pressure on a spinning bond column to leave a viscous golden-yellow liquid with an isocyanate content of 11.5%.

EXAMPLE 3

5 parts of a solution of the allophanate polyisocyanate used in Example 2, 2.4 parts of butyl acetate and methylisobutyl ketone gives a film which is touch-dry in 75 minutes, the solution gelling after 5 days storage.

EXAMPLE 4

5 parts of a solution of the allophanate polyisocyanate used in Example 2, 4 parts of butyl acetate, and 1.5 parts of the bisaldimine from isobutaldehyde and hexamethylene diamine gives a film which is touch-dry in 20 minutes, the solution gelling after 13 days.

EXAMPLE 5

A solution is prepared from 5 parts of a 75% solution of 1:3:5-tris (ω-isocyanatohexyl)biuret in ethyl acetate, 0.8 part of butyl acetate and 2 parts of the aldemine from isobutaldehyde and hexamethylene diamine. This solution gives a film which is touch-dry in 30 minutes, the solution being still fluid after 3 days, gelling after 7 days.

EXAMPLE 6

A solution from 5 parts of an allophanate polyisocyanate from hexamethylene diisocyanate and oxypropylated sorbitol, 4 parts of butyl acetate and 1.6 parts of the bis-aldimine from isobutaldehyde and hexamethylene diamine gives a film which is touch-dry in 15 minutes, the solution gelling after 16 hours. The allophanate-containing polyisocyanate is prepared in a similar manner to that described in Example 2 using 111 parts of oxypropylated sorbitol containing 8.5% hydroxyl groups instead of the oxypropylated hexanetriol, and after removal of unreacted diisocyanate contains 12.0% isocyanate groups.

EXAMPLE 7

3.25 parts of a solution of a condensate of 800 parts of an 80:20 mixture of tolylene-2:4/2:6-diisocyanates and 71.7 parts of a 70:30 mixture of trimethylol propane and diethylene glycol from which the unreacted tolylenediisocyanates have been removed by extraction with light petroleum, and containing 17.6% isocyanate groups, 3.3 parts of butyl acetate and 1.5 parts of the bis-aldimine from isobutaldehyde and hexamethylene diamine gives a film which is touch-dry in 15 minutes, the solution remaining usable for several hours, but gelling after 18 hours.

EXAMPLE 8

2 parts of a 75% solution in ethyl acetate of a biuret polyisocyanate obtained from the reaction of hexamethylene diisocyanate and water and containing 15.2% of isocyanate groups are mixed with 10.9 parts of a 50% solution in toluene of the bis-aldimine derived from an amine-ended polyethylene oxide of equivalent weight 713 and poly- and isobutyraldehyde. The mixture so obtained is stable for 2 days before gelling and gives a slightly rubbery film which is touch-dry in one hour.

EXAMPLE 9

2.3 parts of a 50% solution in toluene of the bis-aldimine derived from an amine-ended polyethylene oxide of equivalent weight 713 and isobutyraldehyde are mixed with 0.5 part of toluene and 1 part of a 75% solution in ethyl acetate containing 12.7% of isocyanate groups prepared by reaction of a mixture of trimethylolpropane and 1:3-butylene glycol with an 80:20 mixture of 2:4- and 2:6-tolylene dissocyanates. The mixture so obtained is stable for up to 16 hours and gives a hard film which is touch-dry in 15 minutes.

EXAMPLE 10

6.72 parts of the bis-aldimine from hexamethylene diamine and isobutyraldehyde are mixed with 30.25 parts of an isocyanate-ended polymer having an isocyanate group content of 8.3% and obtained by interaction of hexamethylene diisocyanate with a polyester containing 4.6% hydroxyl groups and prepared from hexanetriol, 1:3-butylene glycol, and adipic acid. 1.2 parts of water are added to the mixtures so obtained which is then stirred rapidly to disperse the water and poured into a stainless steel mould. After standing for 16 hours at room temperature a tough hard yellow rubber is obtained.

EXAMPLE 11

The procedure of Example 10 is repeated using 3.08 parts of the aldimine, 19.14 parts of isocyanate-ended polymer obtained from an ethylene/propylene adipate of hydroxyl value 3.66%, and 0.55 part of water. A slightly exothermic action leads after 8 minutes to a hard tough pale yellow rubber which is more resilient than the rubber prepared by the procedure of Example 10.

EXAMPLE 12

42.4 parts of isobutyraldehyde are added with stirring over 30 minutes to a solution of 50 parts 1:8-p-menthane diamine in 121.2 parts of toluene, the temperature being allowed to rise to 32° C. but not higher. After a further 30 minutes standing the mixture is cooled to below 20° C. and the water (9.5 parts) formed in the reaction is separated off. The reaction mixture is then distilled under reduced pressure to remove the toluene and then give the bis-aldimine from 1,8-p-menthane diamine and isobutyraldehyde, boiling between 98 and 101° C. a pressure of 0.15 mm. of mercury. This product on analysis contains 10.5% of nitrogen, the calculated value for $C_{18}H_{34}N_2$ being 10.07%.

EXAMPLE 13

The procedure of Example 12 is repeated using 9.9 parts of 1,8-p-menthane diamine, 26 parts of toluene and 10 parts of trimethylacetaldehyde. The bisaldimine obtained boils between 100 and 103° C. at a pressure of 0.25 mm. of mercury and contains 9.1% of nitrogen, the calculated value for $C_{20}H_{38}N_2$ being 9.15%.

By a similar procedure using hexamethylene diamine instead of 1,8-p-menthane diamine there is obtained the bisaldimine of hexamethylene diamine and trimethylacetaldehyde, boiling between 94 and 96° C. at a pressure of 0.25 mm. of mercury, and containing 11.3% of nitrogen, the calculated value for $C_{16}H_{32}N_2$ being 11.11%.

EXAMPLE 14

18 parts of t-butyl methylketone are added with stirring to 11.1 parts of m-xylylenediamine in 22 parts of benzene and the mixture heated at the boil for 3 hours during which time the water formed in the reaction is removed as its azeotrope with benzene. The mixture is then distilled to give benzene and, boiling between 151 and 152° C. at a pressure of 0.6 mm. of mercury, the bisketimine from m-xylylenediamine and t-butylmethylketone, equivalent weight by titration with hydrochloric acid 150.5, theoretical equivalent weight 150.

By a similar procedure using hexamethylenediamine instead of m-xylylene diamine there is obtained a bisketimine boiling between 107 and 109° C. at a pressure of 0.28 mm. of mercury and having an equivalent weight of 144.5, the theoretical equivalent weight being 140.

EXAMPLE 15

Lacquer compositions are prepared by adding the polyaldimines listed below to mixtures of 4.5 parts of butyl acetate and 5 parts of a 75% solution in ethyl acetate of a condensate of trimethylol propane, butylene glycol and an 80:20 mixture of 2:4- and 2:6-tolylenediisocyanates, such solution containing 12.7% of isocyanate groups and less than 0.5% of free tolylenediisocyanates.

| Composition | Components of polyaldimines | Amount of polyaldimine (parts) |
|---|---|---|
| A | 1:8-p-menthanediamine/isobutyraldehyde | 2.1 |
| B | 1:8-p-methanediamine/pivalic aldehyde | 2.3 |
| C | Hexamethylenediamine/pivalic aldehyde | 1.9 |
| D | Hexamethylenediamine/isobutyraldehyde | 1.7 |

The lacquer compositions are cast onto white porcelain tiles and all afforded hard tack-free films within 30 minutes of exposure to the atmosphere at room temperature (23.5° C.) at relative humidity 48%–54%. The lacquer compositions were stored in glass containers out of contact with air. Composition D gelled in 4 hours and composition A in 11 hours, but compositions B and C were still free from gelation after 7 weeks.

EXAMPLE 16

Lacquer compositions are prepared by adding the polyaldimines or polyketimines listed below to 5 parts of an isocyanate-ended polymer having an isocyanate group content of 7.1% prepared from hexamethylene diisocyanate and a polyhexane triol/1,3-butylene glycol adipate containing 4.6% of hydroxyl groups, and sufficient dry butyl acetate to give a solution of 50% solids content.

| Composition | Components of polyaldimine or polyketimine | Amount of polyaldimine or polyketimine | Amount of butyl acetate |
|---|---|---|---|
| E | Hexamethylene diamine/isobutyraldehyde | 0.95 | 5.95 |
| F | Hexamethylene diamine/trimethylacetaldehyde | 1.06 | 6.06 |
| G | 1:8-p-menthanediamine/isobutyraldehyde | 1.17 | 6.17 |
| H | 1:8-p-menthanediamine/trimethylacetaldehyde | 1.29 | 6.29 |

The compositions afforded on white porcelain tiles at 27.5° C. and 54% relative humidity hard tack-free films within 35 minutes in cases of compositions E, F and G and within 5 hours in the case of H. On storage composition E gelled after 32 days and composition G after 12 weeks, but compositions F and H were free from gelation after 14 weeks.

EXAMPLE 17

Lacquer compositions are obtained by adding the polyaldimines listed below to 8.0 parts of a 75% butyl acetate solution containing 2.6% of isocyanate groups of an isocyanate-ended polymer prepared from 2:4-tolylenediisocyanate and polyethylene/propylene adipate of hydroxyl content 3.66% together with sufficient butyl acetate to make a 50% solution.

| Composition | Components of polyaldimine | Amount of polyaldimine | Amount of butyl acetate |
|---|---|---|---|
| I | Hexamethylene-diamine/isobutyraldehyde | 0.55 | 4.55 |
| J | Hexamethylenediamine/trimethyl acetaldehyde | 0.62 | 4.62 |

The compositions afforded on white porcelain tiles hard tack-free films in 30 minutes. On storage composition I gels in 2 days but composition J is free from gelation after 14 weeks.

EXAMPLE 18

Lacquer compositions are obtained by adding the polyketimines listed below to 5 parts of an isocyanate-ended polymer prepared from hexamethylenediisocyanate and polyhexanetriol/1:3-butylene glycol adipate having a hydroxyl content of 4.6% together with sufficient butyl acetate to make a solution of 50% strength.

| Composition | Components of polyketimine | Amount of polyketimine | Amount of butyl acetate |
|---|---|---|---|
| K | m-Xylylenediamine/methylisobutylketone | 1.27 | 6.27 |
| L | m-Xylyenediamine/methyl t-butylketone | 1.27 | 6.27 |

Both lacquer compositions afford hard tack-free films within one hour. On storage composition K gels within 40 hours, but composition L is gel-free after 7 weeks.

What I claim is:

1. A process for the manufacture of isocyanate-based polymers which comprises interacting a mixture consisting essentially of at least one organic polyisocyanate and water in the presence of a member of the group consisting of bis-aldimines obtained by reacting an aldehyde with a polyamine having two primary amino groups and bisketimines obtained by reacting a ketone with a polyamine having two primary amino groups, said aldimines and ketimines being free of isocyanate reactive groups.

2. A process for the manufacture of isocyanate-based polymers which comprises interacting at least one organic polyisocyanate and water in the presence of a member of the group consisting of bis-aldimines obtained by reacting an aldehyde with a polyamine having two primary amino groups and bis-ketimines obtained by reacting a ketone with a polyamine having two primary amino groups, the amount of polyaldimine or polyketimine being such that there is at least about 0.58 isocyanate group for each aldimine or ketimine group.

3. A process as claimed in claim 2 wherein the organic polyisocyanate is an isocyanate-ended prepolymer.

4. A process as claimed in claim 2 wherein the amount of water is not greater than that required to react with the free isocyanate groups present.

5. A process as claimed in claim 2 wherein the amount of polyaldimine or polyketimine is such that one aldimine or ketimine group is present for each isocyanate group.

6. A process as claimed in claim 2 wherein the polyamine is an aliphatic or cycloaliphatic polyamine.

7. A process as set forth in claim 2 in which the amount of polyaldimine or polyketimine is such that there is at present one aldimine or ketimine group for each isocyanate group.

8. A process as set forth in claim 2 in which the amount of polyaldimine or polyketimine is such that there are about 0.58–2 isocyanate groups for each aldimine or ketimine group.

References Cited

UNITED STATES PATENTS

| | | | |
|---|---|---|---|
| 2,912,414 | 11/1959 | Schultheis et al. | 260—77.5 |
| 3,004,933 | 10/1961 | Muller et al. | 260—77.5 |
| 3,050,475 | 8/1962 | Muller et al. | 260—77.5 |
| 3,267,078 | 8/1966 | Damusis | 260—77.5 |
| 2,285,260 | 6/1942 | Downing et al. | 260—808 |
| 2,317,757 | 4/1943 | Graf | 260—570.9 |
| 2,381,526 | 8/1945 | Throdahl | 260—36 |
| 2,416,042 | 2/1947 | Brooks | 260—566 |
| 2,652,367 | 9/1953 | Adelson | 252—46.7 |
| 2,692,284 | 10/1954 | Haury | 260—566 |

FOREIGN PATENTS

| | | |
|---|---|---|
| 720,121 | 10/1965 | Canada. |
| 1,393,412 | 2/1965 | France. |

DONALD E. CZAJA, *Primary Examiner.*

M. J. WELSH, *Assistant Examiner.*

U.S. Cl. X.R.

260—2.5, 77.5, 566